(No Model.)
F. BOREL & E. PACCAUD.
METER FOR ELECTRIC CURRENTS.
No. 337,123. Patented Mar. 2, 1886.
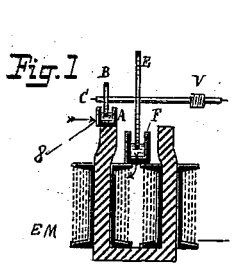
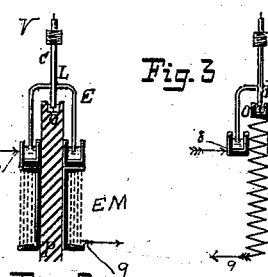
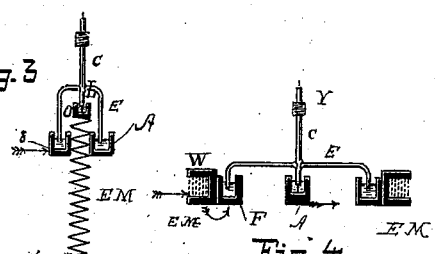
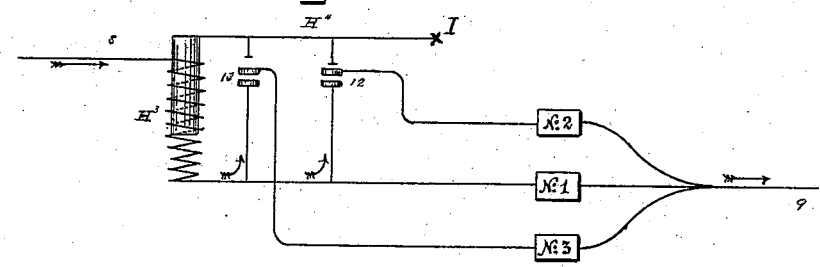
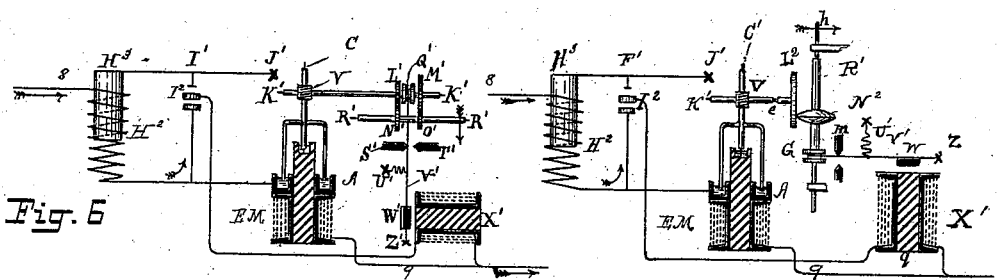

(No Model.) 2 Sheets—Sheet 2.

F. BOREL & E. PACCAUD.
METER FOR ELECTRIC CURRENTS.

No. 337,123. Patented Mar. 2, 1886.

Witnesses
Chas H Smith
J. Staib

Inventors
Francois Borel
Emile Paccaud
per Lemuel W. Serrell
atty

N. PETERS, Photo-Lithographer, Washington, D. C.

UNITED STATES PATENT OFFICE.

FRANÇOIS BOREL, OF CORTAILLOD, AND EMILE PACCAUD, OF LAUSANNE, SWITZERLAND.

METER FOR ELECTRIC CURRENTS.

SPECIFICATION forming part of Letters Patent No. 337,123, dated March 2, 1886.

Application filed March 9, 1885. Serial No. 158,167. (No model.)

*To all whom it may concern:*

Be it known that we, FRANÇOIS BOREL, doctor and electrician, of Cortaillod, and EMILE PACCAUD, vice-president of the Swiss Electric Company, of Lausanne, both in Switzerland, have invented an Improvement in Meters for Measuring Electric Currents, of which the following is a specification.

It is well known that a metallic disk or fork, fitted so that it can rotate, and placed within the field of an electro-magnet, will be rotated if a portion of the electric current traverses said disk or fork, and electric meters based upon this principle have heretofore been made.

In our meter we make use of a rotating body forming part of the electric circuit, and this rotating body is upon either a vertical or horizontal axis, according as it rotates around the pole or between the poles of an electro-magnet.

Our special feature of improvement relates to the mechanism between the shaft of the rotating body and the index-shaft of the registering apparatus and to the means for operating said mechanism, whereby currents of varying intensity can be measured with great accuracy.

Figure 8:
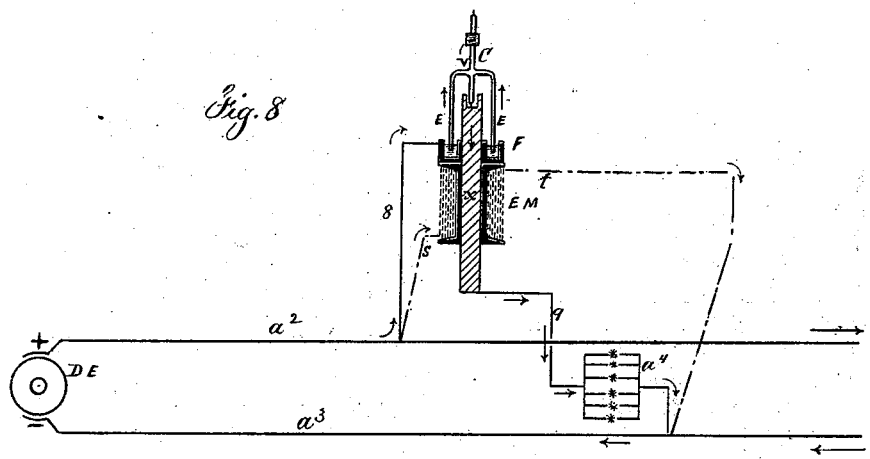
Figure 9:
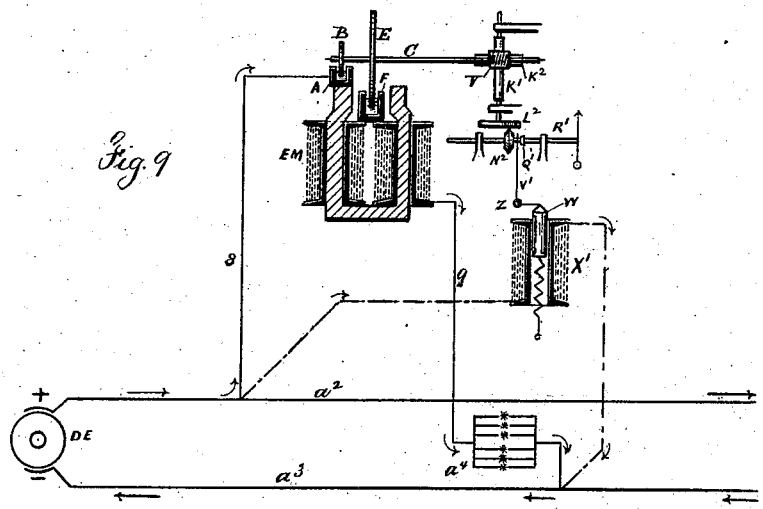

In the drawings, Figures 1, 2, 3, and 4 are sections of the rotating body and its magnet, said rotating body in Fig. 1 being a disk upon a horizontal axis, and in Figs. 2, 3, and 4 a U-shaped fork upon a vertical axis. Fig. 5 is a diagram of three meters in the branch circuit arranged for measuring currents of varying intensity. Figs. 6 and 7 are elevations, partly in section, of our meter. Fig. 8 represents the the electro-magnet and its rotating body and the circuit-connections. Fig. 9 represents a modification of the meter shown in Fig. 8 and the circuit-connections for the same.

Referring to Figs. 8 and 9, D E represent a dynamo-electric machine, $a^2$ the main-circuit wire passing from the dynamo, and $a^3$ the return-wire to the same. The meter is placed in a branch circuit, 8 9, of the main line $a^2 a^3$, and in this branch circuit is the local-distribution circuit $a^4$, containing electric lamps or other devices the current consumed by which is to be measured. The rotating body or armature is either a disk, E, as in Figs. 1 and 9, or a U-shaped fork, E, as in the other figures of the drawings. Where a disk is employed, the axis C is horizontal, and the disk revolves between the two poles of its electro-magnet E M, and the axis also carries a contact-disk, B. Where a U-shaped fork, E, is employed, the axis C is vertical, and the U-shaped fork revolves around one pole of its electro-magnet E M. In either case the edge of the disk E or the ends of the U-shaped fork dip into mercury contained in a trough, F, which trough may be supported upon the electro-magnet or otherwise, and there is also a trough, A, containing mercury for the contact-disk B.

The current passing through the branch circuit may pass through the motor of the meter in various ways. In Figs. 1 and 9 the current goes by $a^2$, 8, mercury in A, disk B, axis C, disk E, mercury in trough F, helix of E M, and wire 9 to center of local-distribution circuit, and through the latter to the return-wire $a^3$. In Figs. 2, 3, 6, and 7 the current goes by $a^2$, 8, mercury in F, U-shaped fork E, axis C, helix of E M, and wire 9 to center of local-distribution circuit. In Fig. 8 the current goes by $a^2$, 8, mercury in F, U-shaped fork E, axis C, core of E M, and wire 9 to center of local-distribution circuit, and the helix of E M is in a branch circuit, $st$. (Shown by dotted lines.) A solenoid might replace the electro-magnet E M, as in Fig. 3, or the helix E M might be in the form of a ring, as in Fig. 4. In either of these various forms the current energizes the magnet E M, and the disk or U-shaped fork E is caused to revolve, and its speed of rotation is in proportion to the intensity of the current passing through the branch circuit.

If either of the motors just described alone were used, it might answer for measuring currents of about uniform intensity by connecting registering mechanism with the worm Y on the shaft C of the rotating body; but in order to measure currents that vary greatly in their intensity we add to either of the before-described motors, as follows:

K', Fig. 6, is a shaft carrying a wheel, V, that gears into the worm-wheel on C, and L' M' are wheels of different diameters, loose upon said shaft K'.

Q' is a coupling fitted to slide and turn with the shaft K', and this coupling is operated by a lever, V, pivoted at Z, and carrying the armature W of the electro-magnet X'.

R' is a shaft carrying the index-hand of the meter, and upon said shaft R' there are firmly secured the wheels N' O', of different diameters.

H² is a solenoid in the branch circuit, and the core H³ of this solenoid is upon a spring-lever, I', pivoted at J'. If the current passing through the branch circuit does not exceed a certain predetermined limit, all the current passes through E M, and the spring U' keeps the lever V' to the left against the stop S', and the coupling Q' connects the wheel L' with the wheel N', and the shaft R' is rotated through said wheels L' N' with a speed proportioned to the intensity of the current passing through the branch circuit. If the intensity of the current exceeds the predetermined limit, which excess would injure the helix of E M, then the core of H² is drawn farther down until the lever I' closes the shunt-circuit at I², in which shunt is the electro-magnet X', of low resistance, and a portion of the current passes through said magnet X' and energizes the same, the electro-magnet X' attracts the lever V', which shifts the coupling Q', disconnecting the wheels L' N' and connecting the wheel M' with the wheel O', and the shaft R' is now rotated by said wheels M' O', with an increased speed proportionate to the increase of the intensity of the current passing through the branch circuit. Upon the current decreasing in intensity below the predetermined limit, the lever I' rises, breaks the shunt-circuit at I², and all the current passes through E M. The lever V' is moved to the left, disconnecting M' O' and connecting L' N', and the shaft R' is rotated with a decreased speed proportionate to the decrease of current passing through the branch circuit. We prefer that the speed produced by the wheels L' M' equal the proportion existing between the resistances of the electro-magnet X' and that of the meter.

In the modification Fig. 7 the gears of Fig. 6 are replaced by friction-disks L² N², the disk L² being on the shaft K', and the disk N² upon a sleeve on the shaft R', and this sleeve is connected to the outer end of the lever V'. As the intensity of the current varies in the magnet X', the lever is V' is moved in one direction by the magnet X', and in the other direction by the spring U', thereby shifting the sleeve and bringing the edge of N¹ nearer to or farther from the center of L², and varying the rate of speed at which N² is driven by contact with L².

In Fig. 9 the mechanism is similar to that in Fig. 7, but we have shown a solenoid, X', of high resistance in a branch circuit for operating the lever V'. There is always a portion of the current passing through this solenoid X'; hence any variations therein cause the core of the solenoid to be moved in or out, thereby moving the lever V', which latter shifts the disk N² nearer to or farther from the center of the disk L², and varies the speed at which N² is drawn by L².

In Fig. 5 we have shown three of our meters arranged so that when the current in the branch circuit reaches a certain intensity in meter No. 1 a portion of said current is diverted through meter No. 2, and upon reaching a certain intensity in No. 2 a portion is diverted through meter No. 3. This is accomplished by placing a solenoid, H³, and meter No. 1 in the branch circuit 8 9 and placing meters Nos. 2 and 3 in shunt-circuits, which shunt-circuits are closed at 12 13 by the lever H⁴ as the solenoid draws in its core by the increase in the intensity of the current. If the resistance of meter No. 2 is one-fourth the resistance of meter No. 1, four-fifths of the current will pass through No. 2 and be registered by it, while the remaining one-fifth will pass through meter No. 1. If meter No. 1 is adapted to register the intensity of a current up to five ampères, and No. 2 to twenty ampères, and if the resistance of No. 3 is one-fifth the resistance of No. 2, and if said meter No. 3 is adapted to register one-hundred ampères, then by the three meters the intensity of a current up to one hundred and twenty-five ampères can be registered, it being necessary to add the readings of the three meters to learn the amount of current passed through the circuit.

The surface of the mercury in the tanks A F should be covered with oil to prevent oxidation of the mercury, and the meter should be inclosed in a box filled with a dead-gas—such as hydrogen, azote, dried air, &c.—or the air may be exhausted from the box and the box sealed.

We claim as our invention—

1. The combination, with the main and branch circuits, of the helix E M in the branch circuits, an armature and shaft rotated by the current passing through said helix and armature, a solenoid in said branch circuit and a lever and circuit-closer operated by said solenoid, an electro-magnet or solenoid, X', in a shunt of the branch circuit, a shaft carrying the index-hand, and mechanism operated by said magnet X' for varying the speed of the index-shaft according to the variations of current in the branch circuit, substantially as and for the purposes specified.

2. The combination, with the main and branch circuits, of the helix E M in the branch circuit, armature E, shaft C, and worm-wheel V, the shaft K', and wheels L' M', loose thereon, the shaft R', and wheels N' O', fixed thereon, the lever V', coupling Q', and spring U', the solenoid H² in the branch circuit, the core H³, lever I', and contacts I², and the solenoid X' in the shunt around the electro-magnet E M, substantially as and for the purposes specified.

3. The combination, with the main and branch circuits, of the helix H² and a meter (No. 1) in said branch circuit, the core H³, lever H⁴, and circuit-closing contacts, a shunt-circuit around the meter (No. 1) passing through such contacts, and a meter (No. 2) in said shunt-circuit of less resistance than the one in the branch circuit, substantially as and for the purposes set forth.

Signed by us this 14th day of February, A. D. 1885.

FRANÇOIS BOREL.
EMILE PACCAUD.

Witnesses:
 LYELL T. ADAMS,
 ELMER SCHNEIDER.